United States Patent [19]

Makita et al.

[11] Patent Number: 5,125,291

[45] Date of Patent: Jun. 30, 1992

[54] TRANSMISSION WITH HYDROSTATIC POWER UNIT

[75] Inventors: Hiroshige Makita; Mitsuru Komatsu, both of Saitama; Norio Komura, Tokyo, all of Japan

[73] Assignee: Honda Giken Kogyo Kabushiki Kaisha, Japan

[21] Appl. No.: 730,043

[22] Filed: Jul. 15, 1991

[51] Int. Cl.⁵ ............................................. F16H 47/00
[52] U.S. Cl. ...................................... 74/730.1; 475/83; 74/606 R
[58] Field of Search ................... 74/606 R, 730.1; 475/83

[56] References Cited

U.S. PATENT DOCUMENTS

| | | |
|---|---|---|
| 2,687,049 | 8/1954 | Ebert ........................... 74/730.1 X |
| 2,962,915 | 12/1960 | Wiggermann ................. 64/730.1 X |
| 4,691,802 | 9/1987 | Ishimori et al. ............... 74/606 R X |
| 4,862,767 | 9/1989 | Hauser ............................... 475/83 |

Primary Examiner—Dirk Wright
Attorney, Agent, or Firm—Howard L. Rose

[57] ABSTRACT

A transmission includes a transmission casing, a speed reducer mechanism housed in the transmission casing, a hydrostatic power unit mounted on the transmission casing, the hydrostatic power unit comprising a pump having a pump shaft and a motor having a motor shaft, the pump shaft and the motor shaft extending parallel to each other, and an input shaft operatively coupled to the pump shaft. The transmission casing has an interior space divided into a first chamber in which the input shaft is disposed and a second chamber in which the speed reducer mechanism is accommodated.

18 Claims, 9 Drawing Sheets

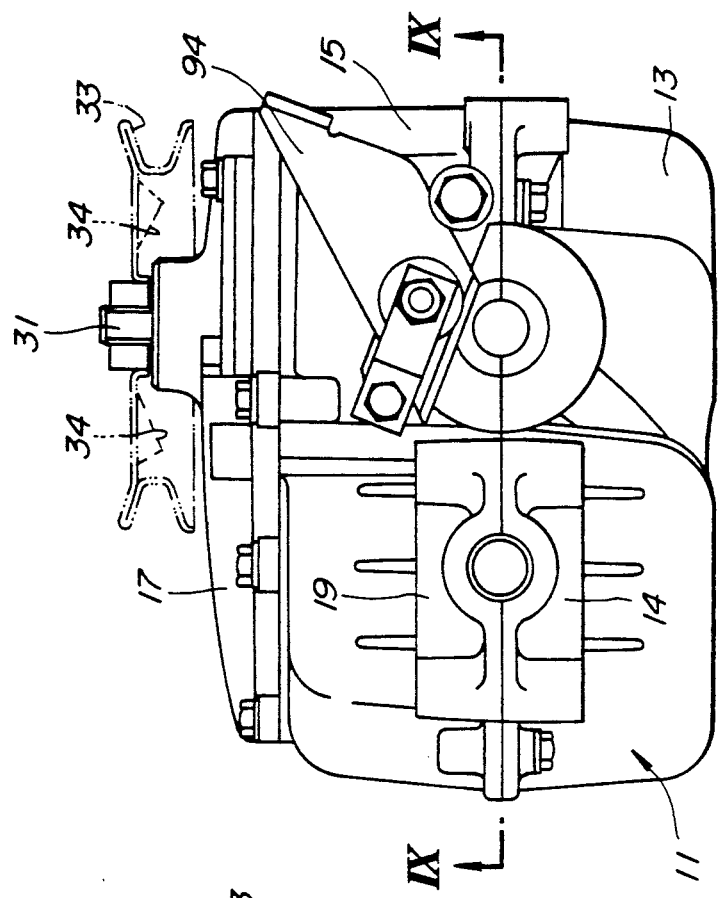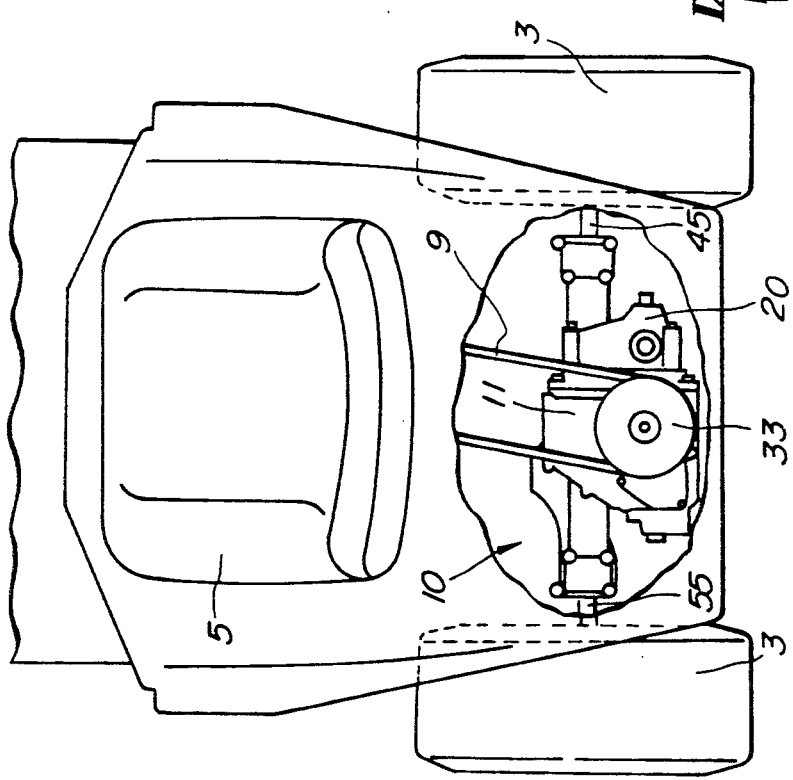

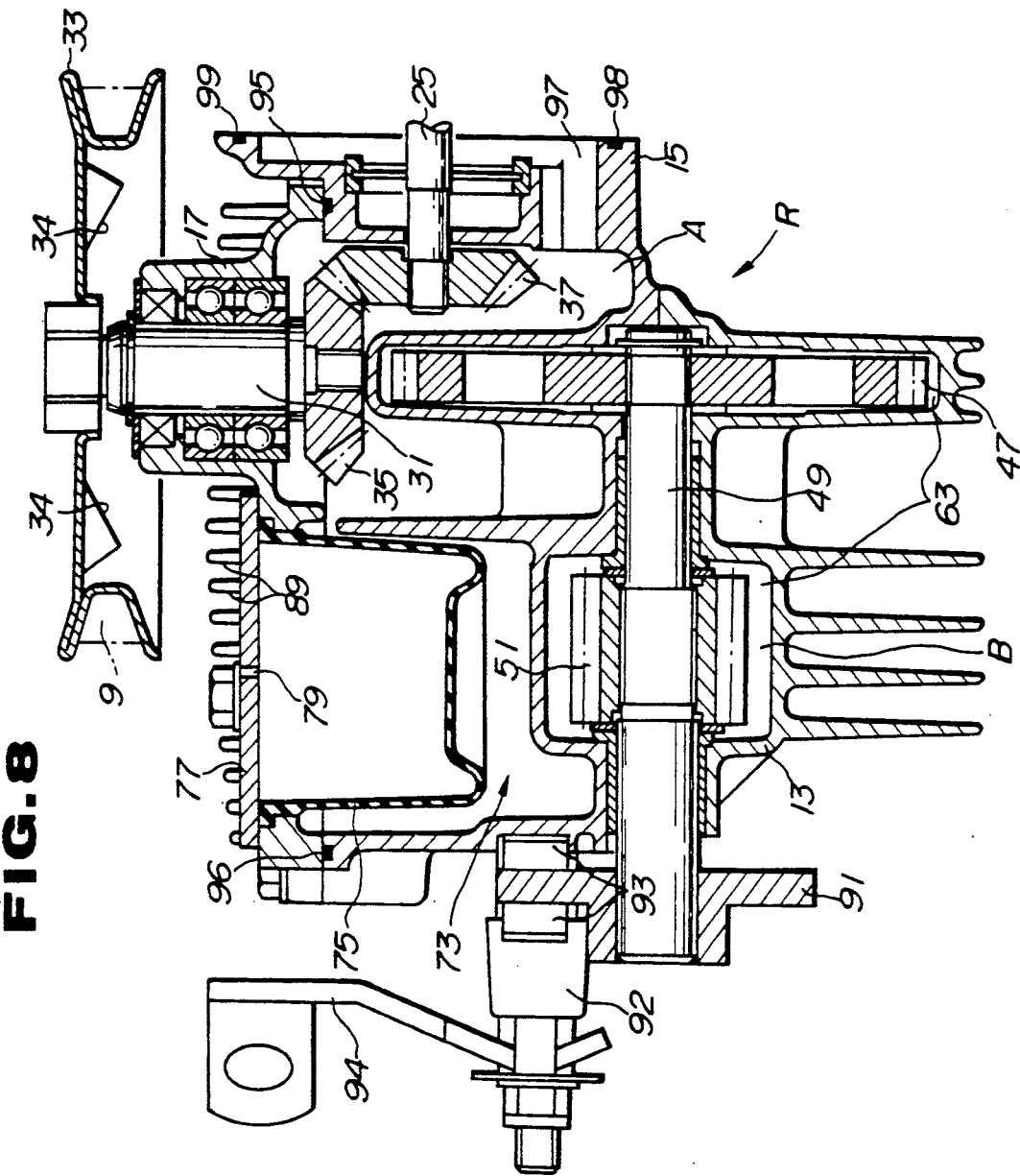

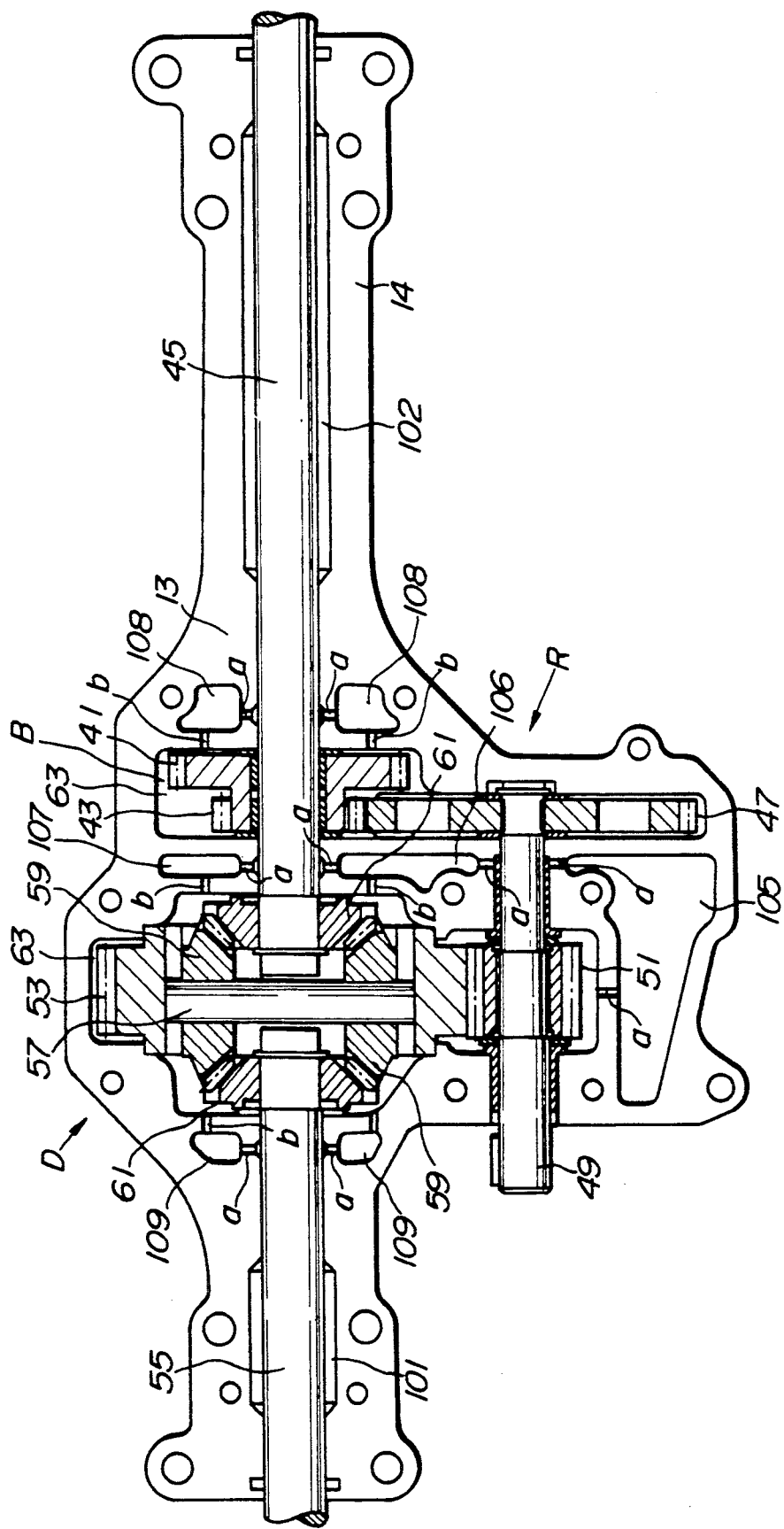

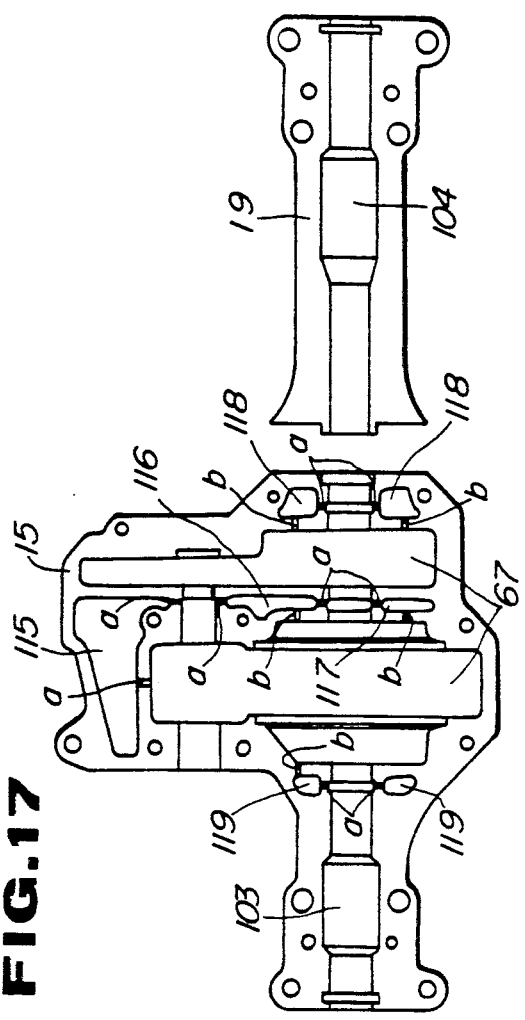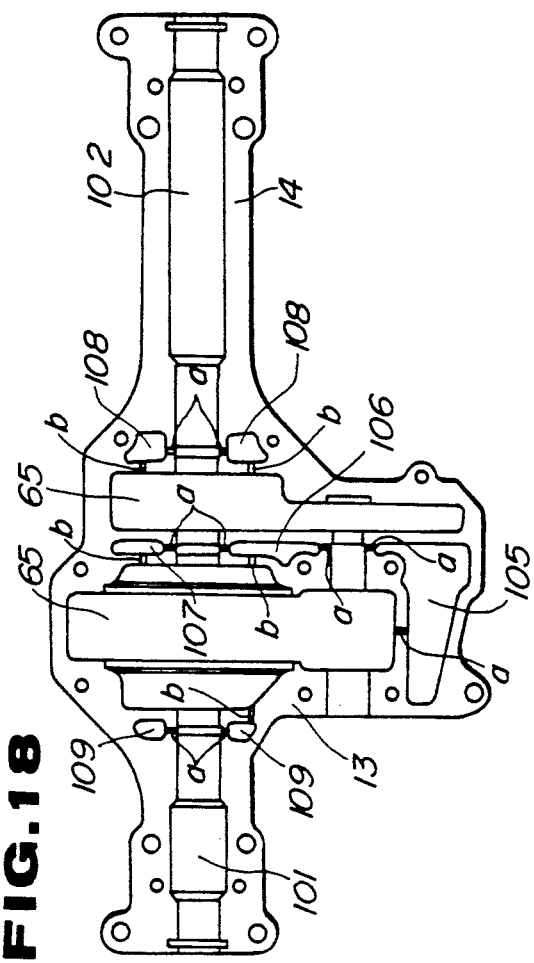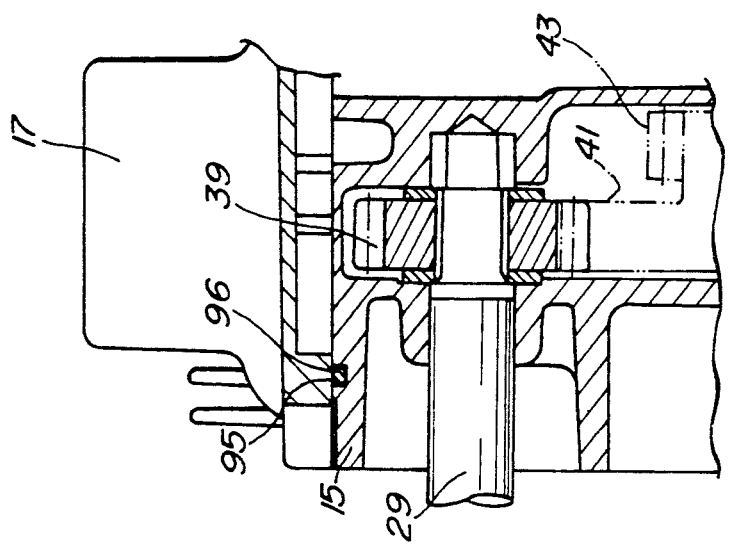

5,125,291

TRANSMISSION WITH HYDROSTATIC POWER UNIT

RELATED APPLICATIONS

U.S. patent applications Ser. Nos. 07/450,263 filed Dec. 13, 1989 and 07/559,896 filed Jul. 30, 1990, are related to the present application and are assigned to the same assignee as the present invention.

BACKGROUND OF THE INVENTION

1. Field of the Invention

The present invention relates to a hydrostatic transmission, and more particularly to a transmission having a hydrostatic power unit comprising a pump having a pump shaft and a motor having a motor shaft, the pump and motor shafts extending parallel to each other, the hydrostatic pump unit being mounted on a transmission casing which houses a speed reducer mechanism.

2. Description of the Relevant Art

Some working vehicles such as riding-type lawn mowers, tractors, etc. employ a transmission having a hydrostatic power unit comprising a pump having a pump shaft and a motor having a motor shaft, the pump and motor shafts extending parallel to each other.

U.S. Pat. No. 4,862,767 discloses a hydrostatic transaxle having a casing to which a hydrostatic power unit is coupled. The casing defines therein a common or single chamber in which bevel gears of an input shaft and a pump shaft are held in mesh with each other, and parallel gears of a speed reducer mechanism and a motor shaft are also held in mesh with each other. The speed reducer mechanism requires three parallel shafts, i.e., the pump shaft, the motor shaft, and an axle.

With the conventional design, the bevel gears of the input shaft and the pump shaft are held in mesh with each other, and the parallel gears of the speed reducer mechanism and the motor shaft are also held in mesh with each other in the common chamber defined in the casing. It has been necessary for a reservoir tank of the hydrostatic power unit to be separate from the casing. Therefore, there has been a limitation on efforts to reduce the size of the casing and the entire hydrostatic transaxle.

Another problem that has limited the reduction of the size is that the speed reducer mechanism is composed of three shafts.

The present invention has been made in order to effectively solve the above problems of the conventional transaxle or transmission with a hydrostatic power unit.

SUMMARY OF THE INVENTION

It is an object of the present invention to provide a transmission with a hydrostatic power unit, which transmission is relatively small in size and made up of a reduced number of parts.

To achieve the above object, there is provided in accordance with the present invention, a transmission comprising a transmission casing, a speed reducer mechanism housed in the transmission casing, a hydrostatic power unit mounted on the transmission casing, the hydrostatic power unit comprising a pump having a pump shaft and a motor having a motor shaft, the pump shaft and the motor shaft extending parallel to each other, and an input shaft operatively coupled to the pump shaft, the transmission casing having an interior space divided into a first chamber in which the input shaft is disposed and a second chamber in which the speed reducer mechanism is accommodated.

According to the present invention, there is also provided a transmission comprising a transmission casing, a speed reducer mechanism housed in the transmission casing, a countershaft rotatably mounted in the transmission casing, an axle rotatably mounted in the transmission casing, a hydrostatic power unit mounted on the transmission casing, the hydrostatic power unit comprising a pump having a pump shaft and a motor having a motor shaft, the pump shaft and the motor shaft extending parallel to each other, a first gear mounted on the motor shaft, a second gear held in mesh with the first gear, a third gear mounted on the countershaft, a fourth gear held in mesh with the third gear, the second and fourth gears being integral with each other and rotatably mounted on the axle, a fifth gear mounted on the countershaft, and a sixth gear mounted on the axle and held in mesh with the fifth gear.

According to the present invention, there is further provided a transmission comprising a transmission casing, a speed reducer mechanism housed in the transmission casing, and a hydrostatic power unit mounted on the transmission casing, the hydrostatic power unit comprising a pump having a pump shaft and a motor having a motor shaft, the pump shaft and the motor shaft extending parallel to each other, the pump shaft and the motor shaft being disposed in one plane, and the speed reducer mechanism having shafts disposed in another plane parallel to said one plane.

The above and further objects, details and advantages of the present invention will become apparent from the following detailed description of a preferred embodiment thereof, when read in conjunction with the accompanying drawings.

BRIEF DESCRIPTION OF THE DRAWINGS

FIG. 3 is a plan view, partly broken away, of a rear portion of each of the motor vehicles shown in FIGS. 1 and 2, the view showing the transmission;

FIG. 6 is a side elevational view of the transmission;

FIG. 8 is a cross-sectional view taken along line VIII—VIII of FIG. 4;

FIG. 9 is a cross-sectional view taken along line IX—IX of FIG. 4;

FIG. 10 is a cross-sectional view taken along line X—X of FIG. 4;

FIG. 17 is a plan view of an upper casing member and an axle holder; and

FIG. 18 is a bottom view of a lower casing member.

DETAILED DESCRIPTION OF THE PREFERRED EMBODIMENT

Figure 1:
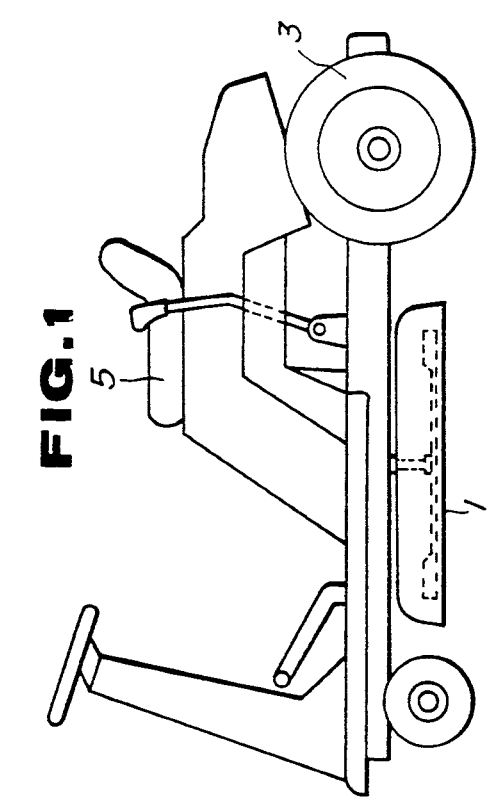
FIG. 1 is a side elevational view of a motor vehicle incorporating a transmission with a hydrostatic power unit according to the present invention.
Figure 2:
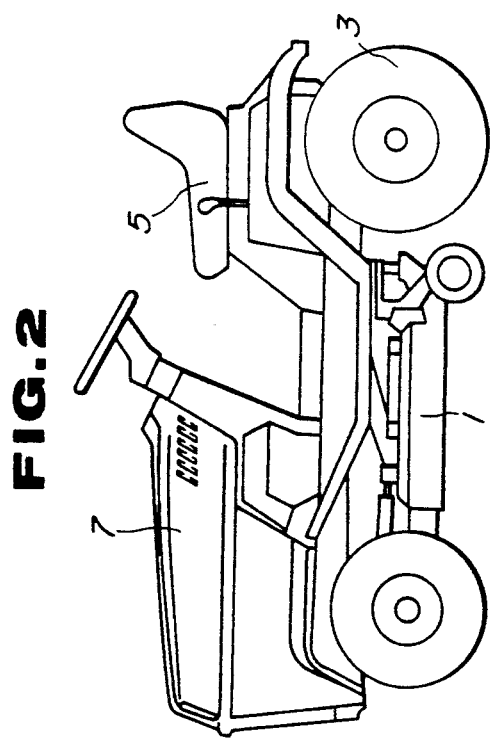
FIG. 2 is a side elevational view of another motor vehicle incorporating a transmission with a hydrostatic power unit according to the present invention.

FIGS. 1 and 2 show riding-type lawn mowers each equipped with a transmission 10 with a hydrostatic power unit according to the present invention. Each of the riding-type lawn mowers has a cutter deck 1, rear wheels 3, and an operator's seat 5. In FIG. 1, an engine is mounted on a rear portion of a vehicle frame underneath the operator's seat 5. In FIG. 2, an engine is mounted in an engine compartment 7 on a front portion of a vehicle frame.

As shown in FIG. 3, each of the riding-type lawn mowers shown in FIGS. 1 and 2 has a transmission 10 positioned between the rear wheels 3 that are located behind the operator's seat 5. The power from the engine is transmitted to the transmission 10 through a belt-and-pully device including a belt 10.

The structure of the transmission 10 will be described below in detail.

As shown in FIGS. 4 through 7 and 15 through 18, the transmission 10 has a transmission casing 11 which comprises a lower casing member 13 and an upper casing member 15. An input shaft holder 17 is coupled to an upper side of the upper casing member 15. The lower casing member 13 has a long axle support 14, and an axle holder 19 is coupled to an upper side of the long axle support 14.

A power unit casing 20 is coupled to a side of the upper casing member 15 closer to the axle holder 19.

Figure 11:
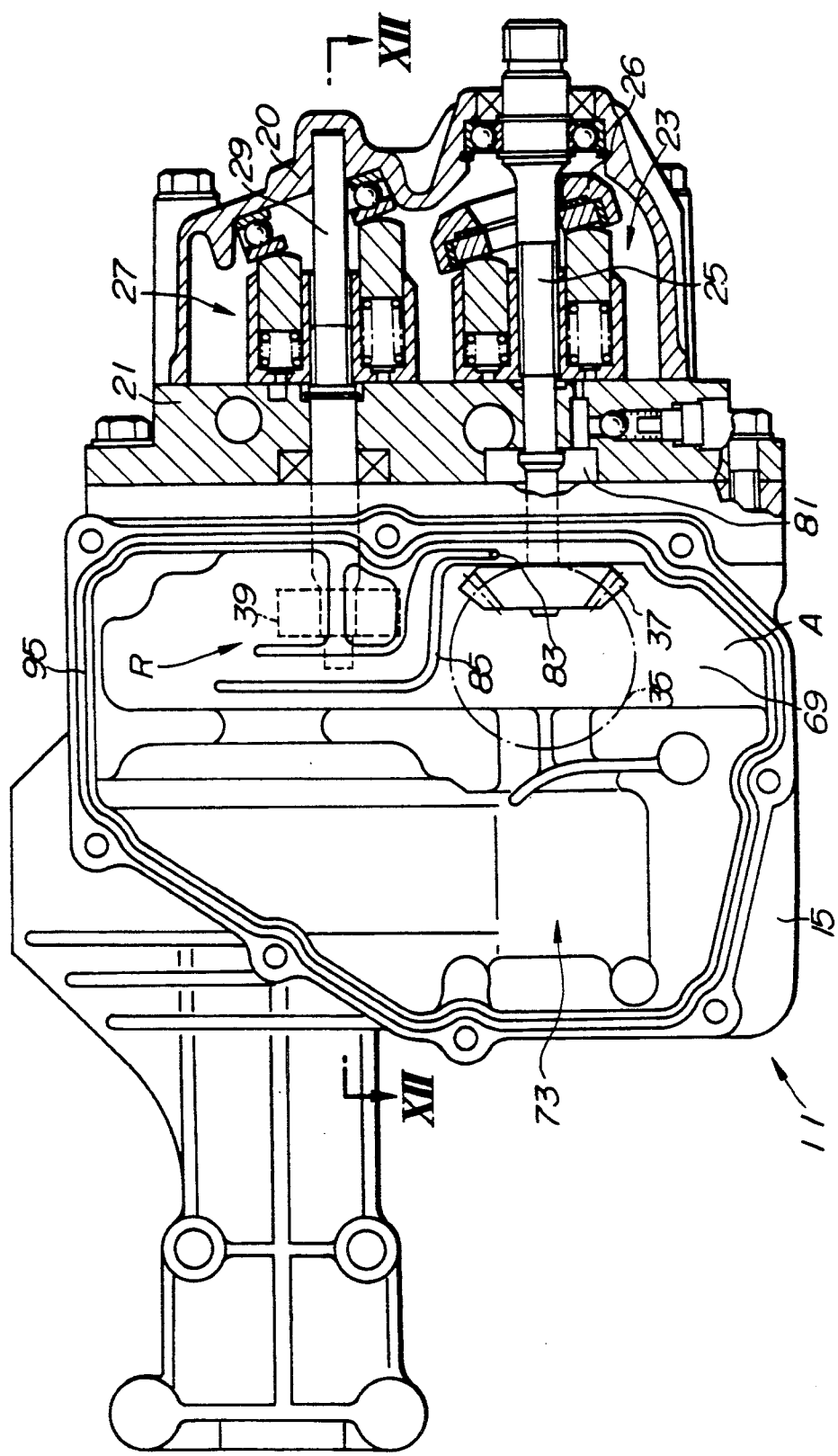
FIG. 11 is a plan view of the transmission, with an input shaft holder being omitted from illustration and the hydrostatic power unit being shown in cross section.

As shown in FIG. 11, the power unit casing 20 houses therein a hydraulic axial piston pump 23 mounted on a base plate 21 and having a pump shaft 25, and a hydraulic axial piston motor 27 mounted on the base plate 21 and having a motor shaft 29. The axial piston pump 23 also has a swash plate 26 disposed around the pump shaft 25.

The pump shaft 25 and the motor shaft 29 extend transversely with respect to the lawn mower and parallel to each other. The pump shaft 25 and the motor shaft 29 lie in the same plane at the same height.

As shown in FIG. 8, an input shaft 31 extends through and is rotatably supported by the input shaft holder 17. The input shaft 31 supports a pulley 33 on its upper end, and a bevel gear 35 on its lower end. The bevel gear 35 is held in mesh with another bevel gear 37 which is mounted on the pump shaft 25.

The belt 9 (see FIG. 3) is trained around the pulley 33 for transmitting the engine power to the pulley 33. The pulley 33 has integral cooling fins 34 which may be formed by punching and raising.

Figure 12:
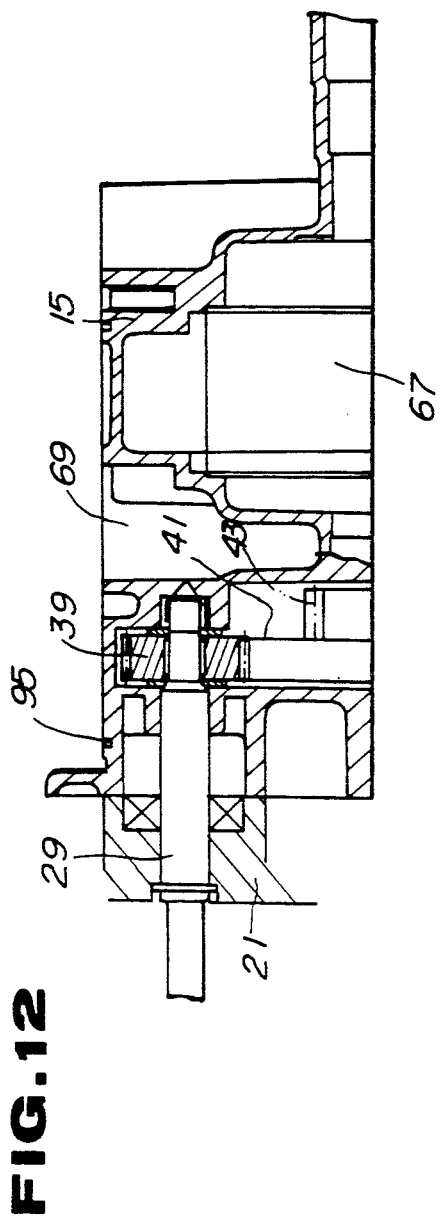
FIG. 12 is a cross-sectional view taken along line XII—XII of FIG. 11.

As shown in FIGS. 10 through 12, the motor shaft 29 supports thereon a small-diameter gear 39 for transmitting rotative power to a speed reducer mechanism R.

As shown in FIG. 9, a large-diameter gear 41 which is held in mesh with the small-diameter gear 39 has an integral small-diameter gear 43 coaxial with the largediameter gear 41. The gears 41, 43 which are integrally formed with each other are rotatably fitted over a long axle 45.

The small-diameter gear 43 is held in mesh with a large-diameter gear 47 mounted on a countershaft 49 which has a final drive gear 51. The speed reducer mechanism R includes the large-diameter gear 41, the small-diameter gear 43, the large-diameter gear 47, and the countershaft 49.

The final drive gear 51 is in mesh with a final driven gear 53 which is disposed between the long axle 45 and a short axle 55 through a differential mechanism D described below.

As shown in FIG. 9, a differential shaft 57 is disposed in the final driven gear 53, and differential pinions 59 are mounted respectively on the opposite ends of the differential shaft 57. The differential pinions 59 are held in mesh with differential gears 61, respectively, that are mounted on respective inner ends of the long and short axles 45, 55. The final driven gear 53, the differential shaft 57, the differential pinions 59, and the differential gears 61 jointly make up the differential mechanism D.

The countershaft 49 and the axles 45, 55 extend parallel to each other in the transverse direction of the lawn mower. The counter shaft 49 and the axles 45, 55 are disposed in the same plane at the same height, but lower than the pump and motor shafts 25, 29. The countershaft 49 is positioned behind the axles 45, 55.

As shown in FIGS. 8 and 9, grease chambers 63 are defined between the lower and upper case member 13, 15 of the transmission casing 11. Each of the grease chambers 63 is composed of an upwardly open gear housing space or recess 65 defined in the lower casing member 13 (see FIG. 18), and a downwardly open gear housing space or recess 67 defined in the upper casing member 15 (see FIGS. 12 and 17).

Figure 15:
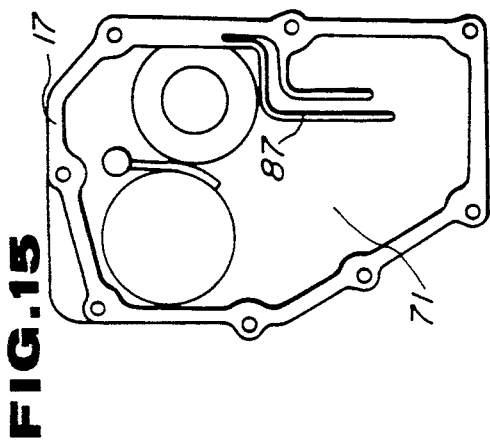
FIG. 15 is a view of the input shaft holder as viewed from inside the transmission.
Figure 16:
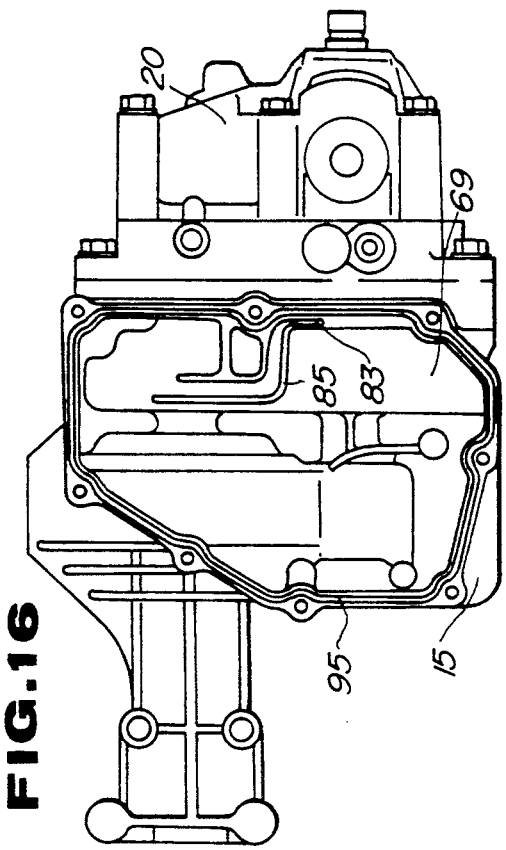
FIG. 16 is a plan view of the transmission with the input shaft holder being omitted from the illustration.

The upper casing member 15 also has an upwardly open gear housing space or recess 69 (which doubles as a reservoir) as shown in FIGS. 11 and 16. As shown in FIG. 15, the input shaft holder 17 which is coupled to the upper casing member 15 has a downwardly open gear housing space or recess 71 (which doubles as a reservoir). The recesses 69, 71 jointly form an oil chamber 73 which is positioned upwardly and rearwardly of the grease chambers 63 (see FIGS. 8 and 11).

As illustrated in FIG. 8, the bevel gear 35 on the lower end of the input shaft 31 and the bevel gear 37 on the end of the pump shaft 25 are held in mesh with each other in the oil chamber 73.

As shown in FIGS. 8 through 10, the gears 39, 41 43, 47, 51, 53, the differential pinions 59, and the differential gears 61 are successively held in mesh within the grease chambers 63 as a gear train extending from the motor shaft 29 to the axles 45, 55.

A cup-shaped diaphragm 75 (FIG. 8) is disposed in the oil chamber 73. The interior of the cup-shaped diaphragm 75 is vented to the atmosphere through a breather hole 79 defined in a diaphragm holder plate 77 which is coupled to the input shaft holder 17.

As shown in FIGS. 8, 9, and 11, the transmission casing 11 has upper and lower chambers A, B defined therein in vertically superposed relationship, the upper and lower chambers A, B being isolated from each other. The upper chamber A serves as the oil chamber 73. The upper chamber A houses therein the input shaft 31, the bevel gear 35 on the lower end thereof, and the bevel gear 37 on the end of the pump shaft 25. The upper chamber A may thus be regarded as an input chamber of the hydraulic pump 23. The lower chamber B serves as the grease chambers 63. The lower chamber B houses therein the small-diameter gear 39 on the motor output shaft 29, the speed reducer mechanism R, and the differential mechanism D. The lower chamber B may thereby be regarded as an output shaft of the hydraulic motor 27.

Figure 13:
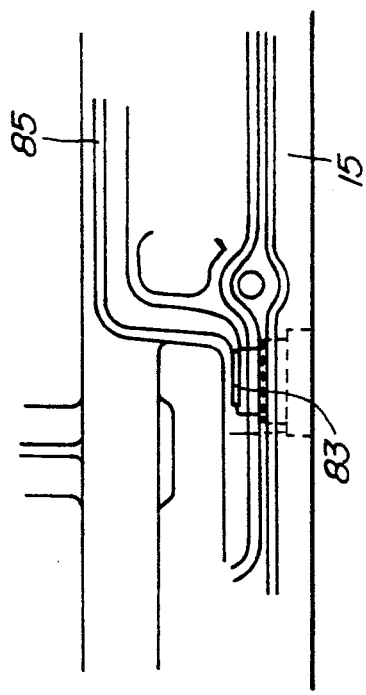
FIG. 13 is a view illustrative of the manner in which oil is circulated by a charging pump.

The pump shaft 25 is combined with a charging pump 81 which is disposed in an end surface of the base plate 21. The charging pump 81 forcibly circulates oil in the oil chamber 73 and the power unit casing 20. The charging pump 81 has an inlet port 83 opening into the oil chamber 73 and defined in a back region of a labyrinth partition 85 of the upper casing member 15, as shown in FIGS. 11, 13, and 16.

The input shaft holder 17 also has a labyrinth partition 87 corresponding to the labyrinth partition 85 (see FIG. 15).

Figure 4:
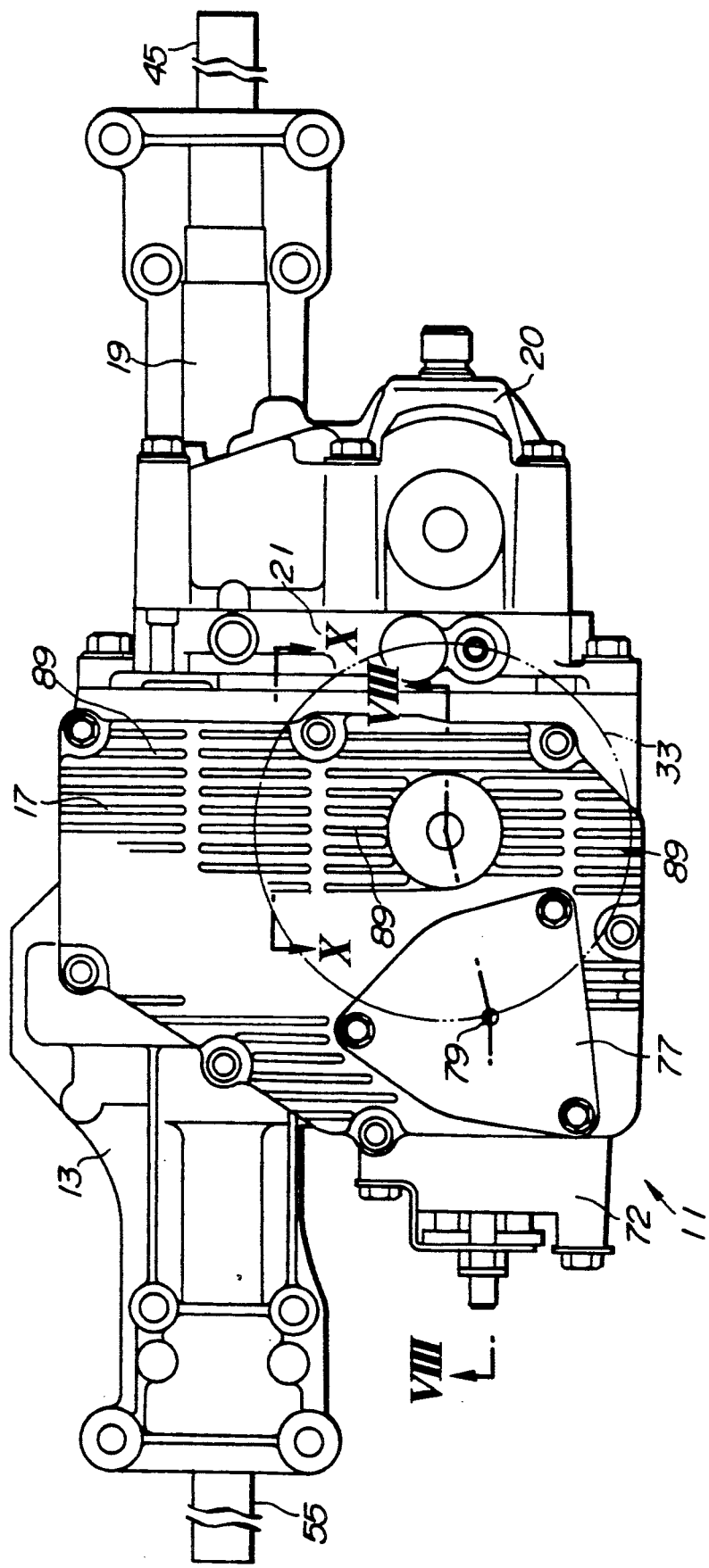
FIG. 4 is a plan view of the transmission.
Figure 5:
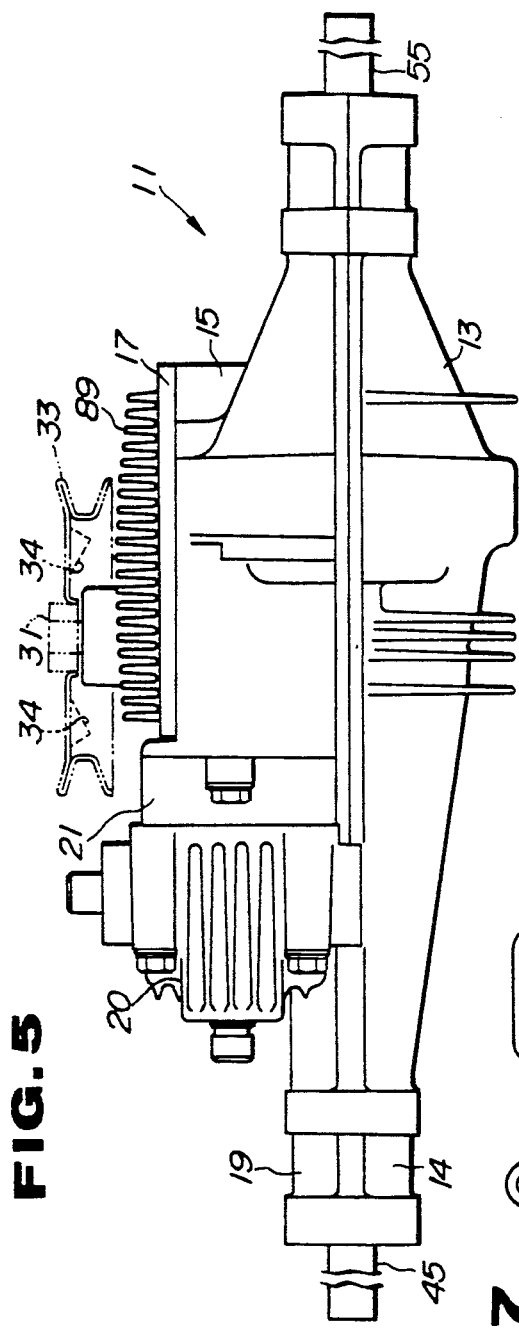
FIG. 5 is a front elevational view of the transmission.
Figure 7:
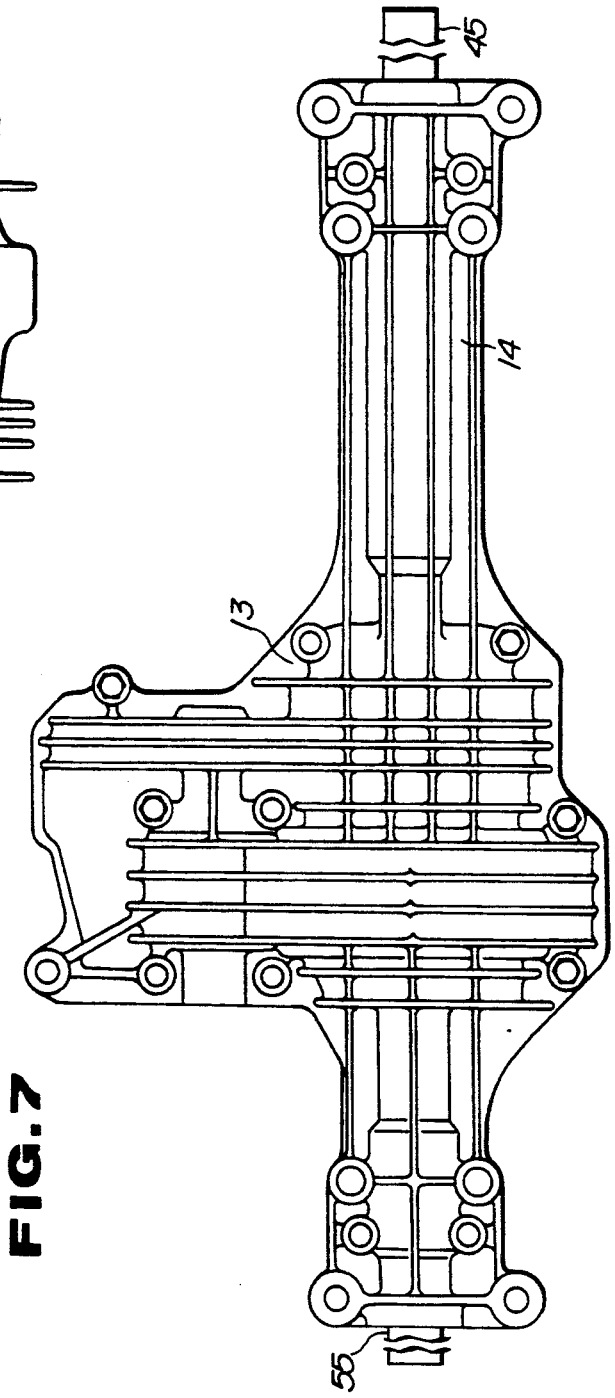
FIG. 7 is a bottom view of the transmission.

As shown in FIGS. 4 and 8, the input shaft holder 17 has a number of cooling fins 89 on its upper surface.

As shown in FIG. 8, a brake disc 91 is mounted on the end of the countershaft 49 which projects out of the transmission casing 11. The brake disc 91 can be gripped by brake seats 93 that can be displaced by a brake pad 92 movable by a brake arm 94.

The countershaft 49 and the axles 45, 55 are rotatably supported between mating surfaces of the lower and upper casing members 13, 15. The axle holder 19 is coupled to the long axle shaft holder 14 of the lower casing member 13.

As shown in FIG. 8, the input shaft holder 17 is coupled to the upper casing member 15 through an O-ring 96 fitted in a seal groove 95 which is defined in the upper surface of the upper casing member 15 and extends along the entire peripheral edge thereof.

Figure 14:
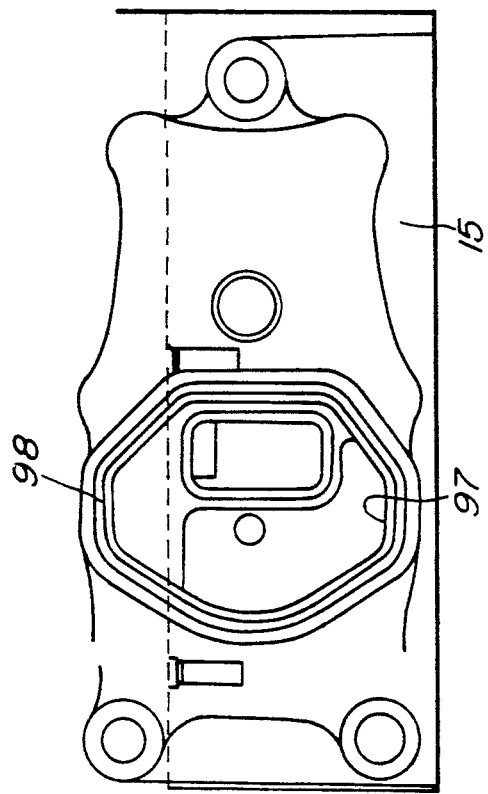
FIG. 14 is a view showing a sealed surface to be provided by an O-ring.

The power unit casing 20 is coupled to the side of the upper casing member 15 close to the axle holder 19 through an O-ring 99 fitted in a seal groove 98 (see FIGS. 8 and 14) which is defined in the side of the upper casing member 15 around an oil chamber opening 97.

The mating surfaces of the lower casing member 13, the upper casing member 15, and the axle holder 19 have a grease reservoir structure as shown in FIGS. 17 and 18.

The lower casing member 13, the upper casing member 15, and the axle holder 19 have grease reservoir recesses 101, 102, 103, 104 defined in their surfaces supporting the axles 45, 55.

Grease reservoir recesses 105, 106, 107, 108, 109 are defined in the upper surface of the lower casing member 13 around the gear housing recesses 65. Grease supply grooves a, b are also defined in the upper surface of the lower casing member 13, the grease supply grooves a, b extending from the grease reservoir recesses 105, 106, 107, 108, 109 to the gear housing recesses 65 and various bearings.

Likewise, grease reservoir recesses 115, 116, 117, 118, 119 are defined in the lower surface of the upper casing member 15 around the gear housing recesses 67. Grease supply grooves a, b are also defined in the lower surface of the upper casing member 15, the grease supply grooves a, b extending from the grease reservoir recesses 115, 116, 117, 118, 119 to the gear housing recesses 67 and the various bearings.

In the transmission 10 of the above structure, the interior space of the upper casing member 15 is divided into the grease chambers 63 and the oil chamber 73 which are vertically spaced from each other, and the bevel gears 35, 37 are held in mesh with each other in the upper oil chamber 73. The speed reducer gears 39, 41, 43, 47, 51, 53, the differential pinions 59, and the differential gears 61, which make up a gear train from the motor shaft 29 to the axles 45, 55, are held in mesh in the lower grease chambers 63. Accordingly, it is not necessary to provide a separate reservoir tank as is the case with the conventional hydrostatic power unit. The transmission is relatively compact in size. The bevel gears 35, 57 coupled to the input shaft 31 which rotates at higher speed are lubricated with oil, while the speed reducer gears 39, 41, 43, 47, 51, 53 which rotates at lower speed are lubricated with grease. Therefore, the gears rotating at different speeds are lubricated with different lubricating materials that best match those gears.

The grease chambers 63 may be sealed with sealing members of less strict tolerances, so that the machining and assembling procedure may be simpler and hence the cost may be lower. Inasmuch as the oil chamber 73 is defined in the transmission casing 11, a separate oil tank is not necessary, and the number of components used is reduced.

In the speed reducer mechanism R, the large-diameter gear 41 meshing with the small-diameter gear 49 on the motor shaft 29 and the small-diameter gear 43 meshing with the large-diameter gear 47 on the countershaft 49 are integral with each other, and these gears 41, 43 are rotatably mounted on the long axle 45. The final drive gear 51 on the countershaft 49 and the final driven gear 53 between the axles 45, 55 are held in direct mesh with each other. Consequently, the speed reducer mechanism R is basically constructed on two shafts, i.e., the countershaft 49 and the combination of axles 45, 55, rather than three shafts as is the case with the conventional transmission. This structure is also effective to make the transmission 10 compact.

The bevel gear 37 meshing with the bevel gear 35 is directly mounted on the pump shaft 25, and the small-diameter gear 39, which is the first gear of the speed reducer mechanism R, is directly mounted on the motor shaft 29. Therefore, since any connecting shaft and its couplings are required, the number of components used is also reduced.

The power unit casing 20 is coupled only to the upper casing member 15 of the transmission casing 11. The power unit casing 20 may thus be coupled with lower accuracy in a simpler process than would be if the power unit 20 were coupled also to the lower casing member 13.

Since the O-ring 99 is interposed between the mating surfaces of the upper casing member 15 and the power unit casing 20, the mating surfaces, which are of metal, are held against each other and can radiate heat generated by the power unit casing 20 to the transmission casing 11 more efficiently than would be if the mating surfaces were joined with each other through a gasket.

The oil in the oil chamber 73 and the oil in the power unit casing 20 can forcibly be circulated by the charging pump 81 in the power unit. When the pulley 33 mounted on the input shaft 31 rotates, the fans 34 on the pulley 33 send cooling air along the cooling fins 89 on the input shaft holder 17 for forcibly cooling the oil in the oil chamber 73, so that any temperature increase of the oil in the oil chamber 73 is minimized.

The oil chamber 73 accommodates therein the cup-shaped diaphragm 75 that is vented to the atmosphere. The diaphragm 75 is elastically deformable to take up a change in the amount of oil in the oil chamber 73 due to a temperature change of the oil. The oil chamber 73 is therefore assuredly filled up with oil at all times, without the danger of trapping air in the oil.

The inlet port 83 of the charging pump 81 which opens into the oil chamber 73 is defined in the back region of the labyrinth partitions 85, 87. The oil introduced from the inlet port 83 is thus not affected by turbulent oil flows that are caused by the meshing bevel gears 35, 37 as they rotate.

The mating surfaces of the transmission casing 11 have, in addition to the grease reservoir recesses 101, 102, 103, 104 around the grease chambers 63 and the axles 45, 55, the grease reservoir recesses 105, 106, 107, 108, 109, 115, 116, 117, 118, 119, and the grease supply grooves a, b extending from the grease reservoir recesses 105, 106, 107, 108, 109, 115, 116, 117, 118, 119 to the bearings and the gear meshing regions. Consequently, the shafts and the meshing gears are lubricated effectively with the grease that is supplied automatically.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

We claim:

1. A transmission comprising:
   a transmission casing;
   a speed reducer mechanism housed in said transmission casing;
   a hydrostatic power unit mounted on said transmission casing, said hydrostatic power unit comprising a pump having a pump shaft and a motor having a motor shaft, said pump shaft and said motor shaft extending parallel to each other;
   an input shaft operatively coupled to said pump shaft;
   said transmission casing having an interior space divided into a first chamber in which said input shaft is disposed and a second chamber in which said speed reducer mechanism is accommodated.

2. A transmission according to claim 1, wherein one of said first and second chambers comprises an oil chamber and the other chamber comprises a grease chamber disposed behind said oil chamber.

3. A transmission according to claim 2, wherein said oil chamber accommodates said input shaft, said speed reducer mechanism comprising a train of gears accommodated in said grease chamber.

4. A transmission according to any one of claims 1 through 3, further including a first gear mounted on said input shaft, a second gear mounted on said pump shaft and held in mesh with said first gear, and a third gear mounted on said motor shaft and held in mesh with said train of gears of said speed reducer mechanism.

5. A transmission according to any one of claims 1 through 4, wherein said hydrostatic power unit has a case mounted on said transmission casing, said transmission casing and said case having mating surfaces joined to each other with an O-ring interposed therebetween.

6. A transmission according to claim 2 or 3, wherein said hydrostatic power unit includes a charging pump for forcibly circulating oil in said oil chamber and oil in said case of said hydrostatic power unit.

7. A transmission according to claim 3 or 6, further including a fan for forcibly cooling oil in the oil chamber in said transmission casing.

8. A transmission according to claim 7, further including a pulley mounted on said input shaft, said fan being disposed on said pulley.

9. A transmission according to claim 6, wherein said charging pump has an inlet port opening into said oil chamber, said transmission casing having labyrinth partitions, said inlet port being defined in a back region of said labyrinth partitions.

10. A transmission according to claim 5, wherein said transmission casing is divided into a pair of casing members, said case of said hydrostatic power unit being coupled to one of said casing members.

11. A transmission according to claim 2 or 3, further including a cup-shaped diaphragm disposed in said oil chamber and having an interior space vented to the atmosphere.

12. A transmission according to claim 2 or 3, wherein said transmission casing has surfaces extending around said grease chamber, said surfaces having grease reservoir recesses and grease supply grooves for supplying grease from said grease reservoir recesses to said speed reducer mechanism.

13. A transmission comprising:
    a transmission casing;
    a speed reducer mechanism housed in said transmission casing;
    a countershaft rotatably mounted in said transmission casing;
    an axle rotatably mounted in said transmission casing;
    a hydrostatic power unit mounted on said transmission casing, said hydrostatic power unit comprising a pump having a pump shaft and a motor having a motor shaft, said pump shaft and said motor shaft extending parallel to each other;
    a first gear mounted on said motor shaft;
    a second gear held in mesh with said first gear;
    a third gear mounted on said countershaft;
    a fourth gear held in mesh with said third gear;
    said second and fourth gears being integral with each other and rotatably mounted on said axle;
    a fifth gear mounted on said countershaft; and
    a sixth gear mounted on said axle and held in mesh with said fifth gear.

14. A transmission according to claim 13, wherein said countershaft has an end extending out of said transmission casing, said transmission further including a brake mechanism mounted on an end of said countershaft which projects out of said transmission casing.

15. A transmission according to claim 13, wherein said pump shaft and said motor shaft are disposed in one plane, said countershaft and said axle being disposed in another plane.

16. A transmission according to claim 1, wherein said pump shaft and said motor shaft are disposed in one plane, said speed reducer mechanism having shafts disposed in another plane parallel to said one plane.

17. A transmission comprising:
    a transmission casing;
    a speed reducer mechanism housed in said transmission casing;
    a hydrostatic power unit mounted on said transmission casing, said hydrostatic power unit comprising a pump having a pump shaft and a motor having a motor shaft, said pump shaft and said motor shaft extending parallel to each other;
    said pump shaft and said motor shaft being disposed in one plane; and said speed reducer mechanism having shafts disposed in another plane parallel to said one plane.

18. A transmission comprising:
- a transmission casing;
- a speed reducer mechanism housed in said transmission casing;
- a hydrostatic power unit mounted on said transmission casing, said hydrostatic power unit comprising a pump having a pump shaft and a motor shaft, said pump shaft and said motor shaft extending parallel to each other;
- an input shaft operatively coupled to said pump shaft;
- said transmission casing having an interior space divided into a first chamber in which said input shaft is disposed and a second chamber in which said speed reducer mechanism is accommodated.

* * * * *